United States Patent [19]

Arai et al.

[11] Patent Number: 5,039,735

[45] Date of Patent: Aug. 13, 1991

[54] ROOM TEMPERATURE VULCANIZABLE ORGANOPOLYSILOXANE COMPOSITION FOR MASKING ELECTRIC OR ELECTRONIC PARTS

[75] Inventors: Masatoshi Arai, Annaka; Koji Yokoo, Tomioka; Yoshifumi Kurihara, Gunma, all of Japan

[73] Assignee: Shin-Etsu Chemical Co., Ltd., Japan

[21] Appl. No.: 351,303

[22] Filed: May 9, 1989

Related U.S. Application Data

[63] Continuation of Ser. No. 61,213, Jun. 12, 1987, abandoned.

[30] Foreign Application Priority Data

Jun. 13, 1986 [JP] Japan ................................. 61-137941

[51] Int. Cl.$^5$ ............................................... C08K 5/20
[52] U.S. Cl. .................................... 524/726; 524/230; 524/860; 528/17; 528/18; 528/22; 528/34; 528/901
[58] Field of Search ..................... 528/901, 34, 22, 17, 528/18; 524/233, 230, 726, 860

[56] References Cited

U.S. PATENT DOCUMENTS

| | | | |
|---|---|---|---|
| 3,996,184 | 12/1976 | Klosowski | 524/233 |
| 4,395,526 | 7/1983 | White et al. | |
| 4,447,576 | 5/1984 | Fukayama et al. | 524/233 |
| 4,486,566 | 12/1984 | Nakasuji et al. | 528/33 |

*Primary Examiner*—John C. Bleutge
*Assistant Examiner*—R. Dean, Jr.
*Attorney, Agent, or Firm*—Lowe, Price, LeBlanc & Becker

[57] ABSTRACT

A room temperature vulcanizable organopolysiloxane composition comprising a diorganopolysiloxane blocked with a hydroxyl group at opposite ends of the molecular chain of the diorganopolysiloxane, a silane or siloxane compound having at least three hydrolyzable groups in the molecule, a filler, and a curing catalyst. The composition further comprises a specific type of amide compound whereby the composition is readily released from electric or electronic parts after having been vulcanized and dipped in a hot soldering bath.

13 Claims, No Drawings

ROOM TEMPERATURE VULCANIZABLE ORGANOPOLYSILOXANE COMPOSITION FOR MASKING ELECTRIC OR ELECTRONIC PARTS

This application is a continuation of application Ser. No. 07/061,213, filed June 12, 1987, now abandoned

BACKGROUND OF THE INVENTION

1. Field of the Invention

This invention relates to room temperature vulcanizable organopolysiloxane compositions which are very useful as a masking material for electric or electronic parts which require dipping in a solder melt.

2. Description of the Prior Art

In the fabrication of printed boards used in various types of electric and electronic appliances, it is the common practice that capacitors, resistors and/or chip parts are connected to a printed board by an automatic soldering apparatus in order to increase the productivity. For this purpose, the printed board is dipped in a soldering bath maintained at a temperature of 250° to 300° C.

If the parts are very liable to deteriorate in quality when heat is applied, they cannot be dipped in a hot soldering bath as they are. Accordingly, these parts are usually masked with a protective material which can stand high temperatures, and are then immersed in a soldering bath. Subsequently, the masking material is removed. Organic rubber latices are frequently used as the masking material, with the attendant disadvantage that their heat resistance is unsatisfactory with poor releasability.

To overcome the above disadvantage, attempts have been made on room temperature vulcanizable or curable organopolysiloxane compositions because of their high heat resistance and good releasability, and some types of organopolysiloxane compositions have been in use. Although the known room temperature vulcanizable organopolysiloxane compositions have a high heat resistance, the cured film of the composition firmly adheres to a printed board after dipping in a soldering bath and becomes difficult to release. Accordingly, there is a demand for development of a masking material which undergoes little or no change in physical property when heated to 250° to 300° C. for several tens seconds and can be readily released from the board after the soldering.

We have made extensive studies on such a masking material or composition which is used to protect electric or electronic parts at the time of soldering, for example, on a printed board. As a result, it has been found that when a specific type of amide compound is added to known room temperature vulcanizable organopolysiloxane compositions for use as a masking material, this material can be readily released from the applied printed board after vulcanization at room temperature and dipping in a soldering bath.

SUMMARY OF THE INVENTION

It is accordingly an object of the invention to provide a room temperature vulcanizable organopolysiloxane composition which has not only a high heat resistance, but also good releasability from electric or electronic parts after it has been converted into a vulcanized film and dipped or immersed in a molten solder maintained at 250° C. to 300° C. for several tens seconds.

It is another object of the invention to provide a room temperature vulcanizable organopolysiloxane composition which contains a specific type of amide compound whereby when the composition is used for masking a printed board, it is readily released from the printed board after dipping in a soldering bath.

The present invention provides a room temperature vulcanizable organopolysiloxane composition which comprises:

a) 100 parts by weight of a diorganopolysiloxane end-blocked blocked with a hydroxyl group, the diorganopolysiloxane having a viscosity of from 100 to 1,000,000 at 25° C.;

b) from 1 to 25 parts by weight of a silane or siloxane compound having at least three hydrolyzable groups in the molecule;

c) from 5 to 300 parts by weight of a filler;

d) from 0.01 to 5 parts by weight of a curing catalyst;

and e) from 0.5 to 10 parts by weight of an amide compound of the following general formula

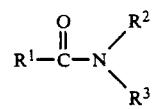

in which $R^1$ and $R^2$ independently represent a hydrogen atom or a monovalent hydrocarbon group having from 1 to 8 carbon atoms, and $R^3$ represents a monovalent hydrocarbon group having from 1 to 8 carbon atoms.

DETAILED DESCRIPTION AND EMBODIMENTS OF THE INVENTION

The diorganopolysiloxane used as one of essential ingredients of the composition according to the invention should be blocked with a hydroxyl group at ends of the molecular chain of the polymer. This type of siloxane is well known and is widely used as a starting material for silicone rubbers. Any known diorganopolysiloxanes may be used without limitation in the practice of the invention.

The type of organic group joined to the silicon atoms in the diorganopolysiloxane is not critical. For instance, the organic groups may include alkyl groups such as a methyl group, an ethyl group, a propyl group, a butyl group and the like; cycloalkyl groups such as a cyclobenzyl group, a cyclohexyl group and the like; alkenyl groups such as a vinyl group, an allyl group and the like; aryl groups such as a phenyl group, a tolyl group, a naphthyl group and the like; alkoxy groups such as a methoxy group, an ethoxy group, a propoxy group and the like; and the above-indicated groups whose hydrogen atoms are partly or wholly substituted with a halogen atom such as a chlorine atom, an amino group and the like.

Typical examples of the diorganopolysiloxanes include α,ω-dihydroxydimethylpolysiloxane, α, ω-dihydroxymethylphenylpolyorganosiloxane, and the like.

The diorganopolysiloxane used in the present invention should have such a degree of polymerization that the viscosity at 25° C. is from 100 to 1,000,000 centistokes, preferably from 1,000 to 5,000 centistokes. If the viscosity is less than 100 centistokes at 25° C., good physical strengths cannot be obtained. On the other hand, over 1,000,000 centistokes, the composition comprising a diorganopolysiloxane having such a high viscosity becomes so viscous that it is difficult to handle.

The (b) ingredient is a silane or siloxane compound which is essential for curing the composition. For this purpose, the silane or siloxane compound should have at least three hydrolyzable groups joined to a silicon atom or silicon atoms in one molecule of the compound.

The hydrolyzable groups include, for example, acyloxy groups such as an acetoxy group, an octanoyloxy group, a benzoyloxy group and the like; ketoxime groups such as a dimethylketoxime group, a methylethylketoxime group, a diethylketoxime group and the like; alkoxy groups such as a methoxy group, an ethoxy group, a propoxy group and the like; alkenyloxy group such as an isopropenyloxy group, a 1-ethyl-2-methylvinyloxy group and the like; amino groups such as a dimethylamino group, a diethylamino group, a butylamino group, a cyclohexylamino group and the like; and aminoxy groups such as a dimethylaminoxy group, a diethylaminoxy group and the like. In view of the corrosion against metals, the alkoxy group and the alkenyloxy group are preferred. The type of silane or siloxane compound is not critical provided that the compound has at least three hydrolyzable groups, and the silicon atom may join groups other than the hydrolyzable groups. The molecular structure may be either a silane structure or a siloxane structure. The siloxane structure may be linear, branched or cyclic. The groups other than the hydrolyzable groups may be an alkyl group such a methyl group, an ethyl group, a propyl group, a butyl group or the like, a cycloalkyl group such as a cyclopentyl group, a cyclohexyl group or the like, an alkenyl group such as a vinyl group, an allyl group or the like, an aryl group such as a phenyl group, a tolyl group, a naphthyl group or the like, an aralkyl group such as a 2-phenylethyl group, and the above-indicated groups whose hydrogen atoms are partly or wholly substituted with a halogen atom such as a chlorine atom, or the like. Typical examples of the silane or siloxane compounds include methyltrimethoxysilane, vinyltrimethoxylsilane, methyltriisopropenyloxysilane, vinyltriisopropneyloxysilane, phenyltriisopropenyloxysilane, methyltriisobutenyloxysilane, and vinyltrimethylethylketoximosilane of the following formulae, respectively:

CH₃Si(OCH₃)₃, CH₂=CHSi(OCH₃)₃

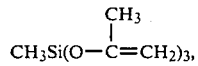

$$CH_3Si(O-\underset{\underset{CH_3}{|}}{C}=CH_2)_3,$$

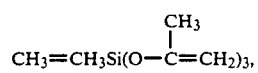

$$CH_3=CH_3Si(O-\underset{\underset{CH_3}{|}}{C}=CH_2)_3,$$

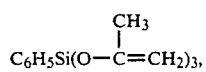

$$C_6H_5Si(O-\underset{\underset{CH_3}{|}}{C}=CH_2)_3,$$

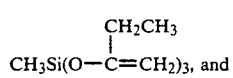

$$CH_3Si(O-\underset{\underset{CH_2CH_3}{|}}{C}=CH_2)_3, \text{ and}$$

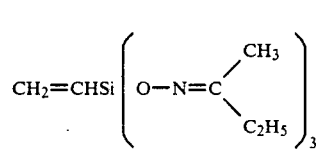

$$CH_2=CHSi\left(O-N=C\underset{C_2H_5}{\overset{CH_3}{\diagup}}\right)_3$$

These compounds may be used singly or in combination provided that the total amount ranges from 1.0 to 25 parts by weight per 100 parts by weight of the (a) ingredient. If the amount is less than 1.0 part by weight, gelation may take place during preparation or storage of the composition, so that desired physical properties of a final product cannot be obtained. When over 25 parts by weight are used the resultant composition suffers too great in shrinkage upon vulcanization or curing, accompanied by a very slow vulcanizing rate and a lowering in elasticity of the resultant vulcanized product. Accordingly, the amount to be used is in the range of from 1.0 to 25 parts by weight, preferably from 2 to 10 parts by weight, per 100 parts by weight of the (a) ingredient.

The filler which is the (c) ingredient in the composition of the invention, may be any known fillers ordinarily used for this purpose. Examples of the fillers include fumed silica with or without treatment with hexamethyldisilazane or cyclic dimethylsiloxane on the surface thereof, precipitated silica, quartz, diatomaceous earth, titanium oxide, aluminum oxide, lead oxide, iron oxide, carbon black, bentonite, graphite, calcium carbonate, mica, clay, glass beads, glass microballoons, silus balloons, glass fibers, polyvinyl chloride balloons, polystyrene beads, acrylic beads and the like. The filler is used in an amount of from 5 to 300 parts by weight, preferably from 10 to 150 parts by weight, per 100 parts by weight of the (a) ingredient. When below 5 parts by weight are used, the resultant vulcanized product has poor mechanical strength, whereas when over 300 parts by weight are used, it is difficult to obtain a vulcanized product which has good rubber elasticity.

The vulcanizing catalyst used as the (d) ingredient in the composition may be any known catalysts used for these types of compositions. Examples of the catalysts include metal salts of organic carboxylic acids such as lead 2-ethyloctoate, dibutyltin dioctoate, dibutyltin diacetate, dibutyltin dilaurate, butyltin 2-ethylhexoate, iron 2-ethylhexoate, cobalt 2-ethylhexoate, manganese 2-ethylhexoate, lead 2-ethylhexoate, stannous caprylate, tin naphthenate, tin oleate, tin butyrate, titanium naphthenate, lead naphthenate, cobalt naphthenate, lead stearate and the like; organic titanic acid esters such as tetrabutyl titanate, tetra-2-ethylhexyl titanate, triethanolamine titanate, tetra(isopropenyloxy) titanate and the like; organic titanium compounds such as organosiloxy titanium, beta-carbonyl titanium and the like; alkoxyaluminium compounds; aminoalkyl-substituted alkoxysilanes such as 3-aminopropyltriethoxysilane, N-(trimethoxysilylpropyl)-ethylenediamine and the like; amine compounds such as hexylamine, dodecylamine phosphate and the like, and salts thereof; quaternary ammonium salts such as benzyltriethylammonium acetate; lower fatty acid salts with alkali metals such as potassium acetate, sodium acetate, lithium oxalate and the like; alkylhydroxylamines such as diemthylhydroxylamine, diethylhydroxylamine and the like; guanidine compounds of the following formulae

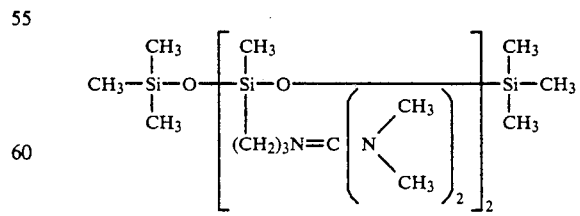

and guanidine group-containing silanes or siloxanes. These curing catalysts may be used singly or in combination.

The (d) ingredient may be used in an amount of from 0.01 to 5 parts by weight per 100 parts by weight of the (a) ingredient. If the amount used is less than 0.01 part by weight, it undesirably takes a long time before the composition will be cured. In addition, it becomes difficult to uniformly cure the composition when it is applied as a thick film. On the other hand, when the amount used exceeds 5 parts by weight, the curing time becomes too short, which is disadvantageous in handling.

The present invention is characterized by incorporation of the (e) ingredient or the amide compound in the composition. This amide compound is added so as to facilitate release of the cured product of the composition from a printed board. The amide compound useful in the practice of the invention is represented by the following general formula

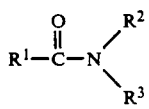

in which $R^1$ and $R^2$ independently represent a hydrogen atom or an unsubstituted or substituted monovalent hydrocarbon group having from 1 to 8 carbon atoms, and $R^3$ represents an unsubstituted or substituted monovalent hydrocarbon group. Examples of the unsubstituted or substituted monovalent hydrocarbon groups represented by $R^1$, $R^2$ and $R^3$ include an alkyl group such as a methyl group, an ethyl group, a propyl group, a butyl group or the like, an alkenyl group such as a vinyl group, an allyl group or the like, an aryl group such as a phenyl group, a tolyl group or the like, a cycloalkyl group such as a cyclohexyl group or the like, and those groups indicated above in which part or all of the hydrogen atoms joined to the carbon atoms are substituted with a halogen atom, a cyano group and the like, e.g. a chloromethyl group, a trifluoropropyl group, a cyanoethyl group and the like. Typical and preferable examples of the amide compounds are N,N-dimethylformamide, N,N-diethylformamide, N-ethylacetamide and N-ethylbenzamide of the following formulae, respectively:

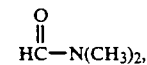

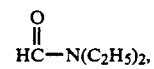

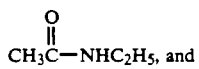

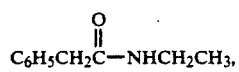

The amide compound is added in an amount of from 0.5 to 10 parts by weight per 100 parts by weight of the (a) ingredient. If the amount used is less than 0.5 parts by weight, the releasability cannot be satisfactorily imparted to the composition. When over 10 parts by weight are used, the cured product of the resultant composition has a lower mechanical strength. Preferably, the amount used ranges from 1 to 5 parts by weight per 100 parts by weight of the (a) ingredient.

The composition of the invention can be prepared by uniformly mixing predetermined amounts of the (a) through (e) ingredients. In application, the composition is coated onto a desired electric or electronic part such as a printed board by any known coating techniques, usually in a thickness of from 0.5 to 2 mm. The coated composition is allowed to stand at room temperature for 24 to 48 hours, thereby forming a cured or vulcanized elastic film. As a matter of course, heat may be applied to the coated film to facilitate the vulcanization. When the film-bearing part is immersed in a solder melt bath maintained at 250° to 300° C. for 30 seconds, the film does not adhere to the part and can readily release therefrom. Thus, the composition is very useful as a masking material for electric or electronic parts such as printed boards.

The composition of the invention may further comprise plasticizers, colorants such as pigments, flame retardants, thixotropic agents, antibacterial agents, angifungus agents and the like in amounts which will not impede the characteristic properties of the composition.

The present invention is more particularly described by way of examples, in which parts are by weight. In the examples, the viscosity is a value measured at 25° C.

EXAMPLE 1 AND COMPARATIVE EXAMPLE 1

50 parts of fumed silica were added to 100 parts of α,ω-dihydroxydimethylpolysiloxane having a viscosity of 1,500 centistokes and mixed under heating conditions of 150° C. for 2 hours to obtain base compound No. 1.

6 parts of a siloxane of the following formula, which is the (b) ingredient,

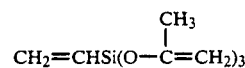

0.7 parts of a compound of the formula, $[(CH_3)_2N]_2C=NC_3H_6Si(OCH_3)_3$, which is the (d) ingredient, and 3 parts of N-ethylacetamide were added to 100 parts of the base compound No. 1, followed by uniform mixing to obtain composition No. 1. For comparison, the above procedure was repeated without addition of the N-ethylacetamide, thereby obtaining composition No. 2.

The composition Nos. 1 and 2 were each coated onto a glass-epoxy resin printed board in a thickness of about 1 mm and allowed to stand under conditions of 20° C. and 55% R.H. for 24 hours for curing. The cured films of both compositions could readily be removed from the respective boards. Thereafter, the coated boards were each immersed in a solder melt bath at 270° C. for 10, 20 and 30 seconds and withdrawn from the bath to determine the releasability. The results are summarized in Table 1 below.

The releasability was evaluated herein and hereinafter as follows: "good" means good releasability, "moderate" means partial adhesion, and "poor" means complete adhesion.

TABLE 1

| | Initial Releasability At Normal Temp. | Releasability After Dipping in Solder Melt Bath | | |
|---|---|---|---|---|
| | | 10 sec. | 20 sec. | 30 sec. |
| Example 1 (Composition No. 1) | good | good | good | good |
| Comp. Ex. 1 | good | poor | poor | poor |

EXAMPLES 2 TO 5 AND COMPARATIVE EXAMPLE 2

100 parts of α,ω-dihydroxydimethylpolysiloxane having a viscosity of 20,000 centipoises were mixed with 15 parts of fumed silica which had been treated with dimethyldichlorosilane on the surfaces thereof, followed by kneading to obtain base compound No. 2.

Ingredients (b), (d) and (e) indicated in Table 2 were added to 100 parts of the base compound No. 2 in the amounts indicated in Table 2, followed by uniform mixing, thereby obtaining composition Nos. (3) to (7). Each composition was applied onto a printed board and was then subjected to the determination of the releasability in the same manner as in Example 1. The results are shown in Table 3.

TABLE 2

| Composition No. | Example 2 / 3 | Example 3 / 4 | Example 4 / 5 | Example 5 / 6 | Comp. Ex. 2 / 7 |
|---|---|---|---|---|---|
| Base compound (parts) | 100 | 100 | 100 | 100 | 100 |
| (b) Ingredient: | | | | | |
| $CH_3Si(O-C(CH_3)=CH_2)_3$ | 6 | 6 | 6 | — | — |
| $CH_2=CHSi(O-N=C(C_2H_5)-CH_3)_3$ | — | — | — | 6 | 6 |
| (d) Ingredient: | | | | | |
| $[(CH_3)_2N]_2C=NC_3H_6Si(OCH_3)_3$ | 0.7 | 0.7 | — | — | 0.7 |
| Dibutyltin diacetate | — | — | 0.1 | 0.1 | — |
| (e) Ingredient: | | | | | |
| $HC(=O)-N(CH_3)_2$ | 3.0 | — | — | — | — |
| $CH_3C(=O)-NHC_2H_5$ | — | 1.0 | 3.0 | — | 0.3 |
| $C_6H_5CH_2C(=O)-NHC_2H_5$ | — | — | — | 3.0 | — |

TABLE 3

| | Initial Releasability (normal temp.) | Releasability after Immersion in Solder Melt Bath | | |
|---|---|---|---|---|
| | | 10 seconds | 20 seconds | 30 seconds |
| Example 2 (Composition No. 3) | good | good | good | good |
| Example 3 (Composition No. 4) | good | good | good | moderate |
| Example 4 (Composition No. 5) | good | good | good | good |
| Example 5 (Composition No. 6) | good | good | good | good |
| Comp. Ex. 2 (Composition No. 7) | good | moderate | moderate | poor |

As will be apparent from the above results, the compositions of the invention comprising a specific type of amide compound show good releasability when immersed in a hot solder bath. On the other hand, the organosiloxane compositions free of such amide compounds for comparison are significantly poorer in releasability.

What is claimed is:

1. A room temperature vulcanizable organopolysiloxane composition which consists essentially of
   a) 100 parts by weight of a diorganopolysiloxane end-blocked with a hydroxyl group, the diorganopolysiloxane having a viscosity of from 100 to 1,000,000 centistokes at 25° C.;
   b) from 1 to 25 parts by weight of a silane or siloxane compound having at least three hydrolyzable groups in the molecule;
   c) from 5 to 300 parts by weight of a filler;
   d) from 0.01 to 5 parts by weight of a curing catalyst;
   and e) from 0.5 to 10 parts by weight of an amide compound of the following general formula

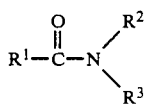

in which $R^1$ and $R^2$ independently represent a hydrogen atom or a monovalent hydrocarbon group having from 1 to 8 carbon atoms, and $R^3$ represents a monovalent hydrocarbon group having from 1 to 8 carbon atoms.

2. The room temperature vulcanizable organopolysiloxane composition according to claim 1, wherein said diorganopolysiloxane has a viscosity of from 1000 to 5,000 centistokes at 25° C.

3. The room temperature vulcanizable organopolysiloxane composition according to claim 1, wherein said at least three hydrolyzable groups are each an alkoxy group.

4. The room temperature vulcanizable organopolysiloxane composition according to claim 1, wherein said at least three hydrolyzable groups are each an alkenyloxy group.

5. The room temperature vulcanizable organopolysiloxane composition according to claim 1, wherein the compound of (b) is a silane compound.

6. The room temperature vulcanizable organopolysiloxane composition according to claim 1, wherein the compound of (b) is a siloxane compound.

7. The room temperature vulcanizable organopolysiloxane composition according to claim 6, wherein said siloxane compound has a linear, branched or cyclic structure.

8. The room temperature vulcanizable organopolysiloxane composition according to claim 1, wherein said filler is used in an amount of from 10 to 150 parts by weight per 100 parts by weight of said diorganopolysiloxane.

9. The room temperature vulcanizable organopolysiloxane composition according to claim 1, wherein said amide compound is used in an amount of from 1 to 5 parts by weight per 100 parts by weight of said diorganopolysiloxane.

10. The room temperature vulcanizable organopolysiloxane composition according to claim 1, wherein said amide compound is N,N-dimethylformamide of the following formula,

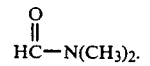

11. The room temperature vulcanizable organopolysiloxane composition according to claim 1, wherein said amide compound is N,N-diethylformamide of the following formula, $$\underset{\text{HC}-\text{N}(C_2H_5)_2}{\overset{\overset{\text{O}}{\|}}{}}.$$

12. The room temperature vulcanizable organopolysiloxane composition according to claim 1, wherein said amide compound in N-ethylacetamide of the following formula, $$\underset{\text{CH}_3\text{C}-\text{NHC}_2\text{H}_5}{\overset{\overset{\text{O}}{\|}}{}}.$$

13. The room temperature vulcanizable organopolysiloxane composition according to claim 1, wherein said amide compound is N-ethylbenzamide of the following formula, $$\underset{\text{C}_6\text{H}_5\text{CH}_2\text{C}-\text{NHCH}_2\text{CH}_3}{\overset{\overset{\text{O}}{\|}}{}}.$$

* * * * *